United States Patent
Wu et al.

(10) Patent No.: US 6,778,339 B2
(45) Date of Patent: Aug. 17, 2004

(54) OPTICAL SYSTEM AND METHOD FOR POSITIONING OPTICAL SYSTEM

(75) Inventors: Chih-Ping Wu, Taipei (TW); Shih-Lung Hsu, Taoyuan (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 10/412,923

(22) Filed: Apr. 14, 2003

(65) Prior Publication Data

US 2003/0193725 A1 Oct. 16, 2003

(30) Foreign Application Priority Data

Apr. 15, 2002 (TW) ........................................ 91107647 A

(51) Int. Cl.⁷ .................................................. G02B 7/02
(52) U.S. Cl. ........................................ 359/819; 359/811
(58) Field of Search ................................ 359/811, 819, 359/822, 831

(56) References Cited

U.S. PATENT DOCUMENTS

| | | | | |
|---|---|---|---|---|
| 4,012,124 A | * | 3/1977 | Toda et al. ................. | 359/700 |
| 5,177,641 A | * | 1/1993 | Kobayashi et al. ......... | 359/820 |
| 5,793,525 A | * | 8/1998 | Sabin et al. ................ | 359/384 |
| 5,999,344 A | * | 12/1999 | Wulfsberg et al. .......... | 359/819 |
| 6,275,344 B1 | * | 8/2001 | Holderer ..................... | 359/822 |

* cited by examiner

Primary Examiner—Ricky Mack
(74) Attorney, Agent, or Firm—Snell & Wilmer L.L.P.

(57) ABSTRACT

The present invention provides an optical system. The optical system includes a first optical apparatus, a second optical apparatus, and a thrust member. A side of the first optical apparatus has a rest. The second optical apparatus is disposed between the first optical apparatus and the thrust member. With the optical system, the second optical apparatus is pressed against the rest by means of the force of the thrust member to keep the relative position between the first optical apparatus and the second optical apparatus stable.

13 Claims, 4 Drawing Sheets

OPTICAL SYSTEM AND METHOD FOR POSITIONING OPTICAL SYSTEM

CROSS REFERENCE TO RELATED APPLICATIONS

This Application claims priority to Taiwan Patent Application No. 091107647 entitled "Optical System And Method For Positioning An Optical System", filed Apr. 15, 2002.

FIELD OF INVENTION

The present invention relates to an optical system and a method for positioning an optical system, and more particularly, to a system and a method less affected by the unprecise dimensions of the internal members of the optical system.

BACKGROUND OF THE INVENTION

In recent years, a projector has been an equipment for effectively providing information during information presentation or entertainment.

A projector incorporating the polarized light splitting characteristics of the polarization beam splitter allows a user to present his/her information over a screen. The projector has a light engine and a lens. The light engine includes a light source, a polarization beam splitter, and at least one panel. The light engine and the lens work cooperatively to form an image, i.e. the lens projects the image from the light engine onto a screen. The coordination between the lens and the light engine is very important, since it will affect directly the brightness distribution and the quality of the image on the screen.

In general, the precise coordination between the lens and the light engine depends on the precise dimensions of a lens flange, internal members, and holders of internal members of the optical system in the projector. Thus, unless the dimensions of all internal members are strictly controlled, the accumulation error or the assembly error is inevitable. However, the control of the precise dimensions of internal members leads to an undesirable increase in manufacturing costs.

In addition, since the life cycle of the polarization beam splitter is limited, the user needs to change it as required. Thus, the polarization beam splitter in the optical system is usually designed as a detachable type allowing easy replacement. Therefore this design may increase the error of the relative position between the holder of the polarization beam splitter and internal members. Accordingly, the relative position among them needs to be realigned after replacing a new polarization beam splitter. On the other hand, the replacement and alignment is generally done only by well-trained technicians, and it is complicated and inconvenient.

Accordingly, a demand for an optical system that is less affected by the unprecise dimensions of the internal members exists.

SUMMARY OF THE INVENTION

An aspect of the present invention is to solve the positioning problem within the optical system, and to reduce the error caused by the unprecise dimensions of the internal members of the optical system.

The present invention provides an optical system, which includes a first optical apparatus having a rest on a side thereof, a thrust member, and a second optical apparatus disposed between the first optical apparatus and the thrust member.

The optical system uses a force applied from the thrust member to press the second optical apparatus against the rest to maintain a desired relative relationship between the first optical apparatus and the second optical apparatus.

The present invention further provides a method for positioning an optical system that may be applied in a projector or a positioning device of the optical system. In this method, the optical system includes a first optical apparatus having a rest on a side thereof, a thrust member, and a second optical apparatus disposed between the first optical apparatus and the thrust member.

The method for positioning an optical system in the present invention includes applying a force from the thrust member to press the second optical apparatus against the rest to maintain a desired relative relationship between the first optical apparatus and the second optical apparatus.

BRIEF DESCRIPTION OF THE DRAWINGS

The present invention, together with aspects and advantages thereof, may best be understood by reference to the following detail description together with the accompanying drawings in which.

DETAILED DESCRIPTION

Figure 1A:
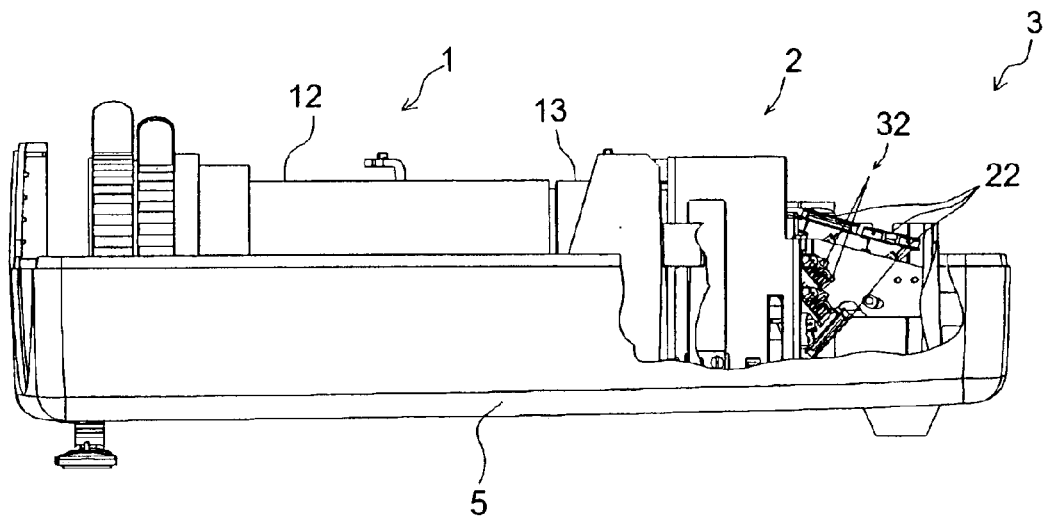
FIG. 1(a) is a partial cut-away view showing an optical system of an exemplary embodiment according to the present invention.
Figure 1B:
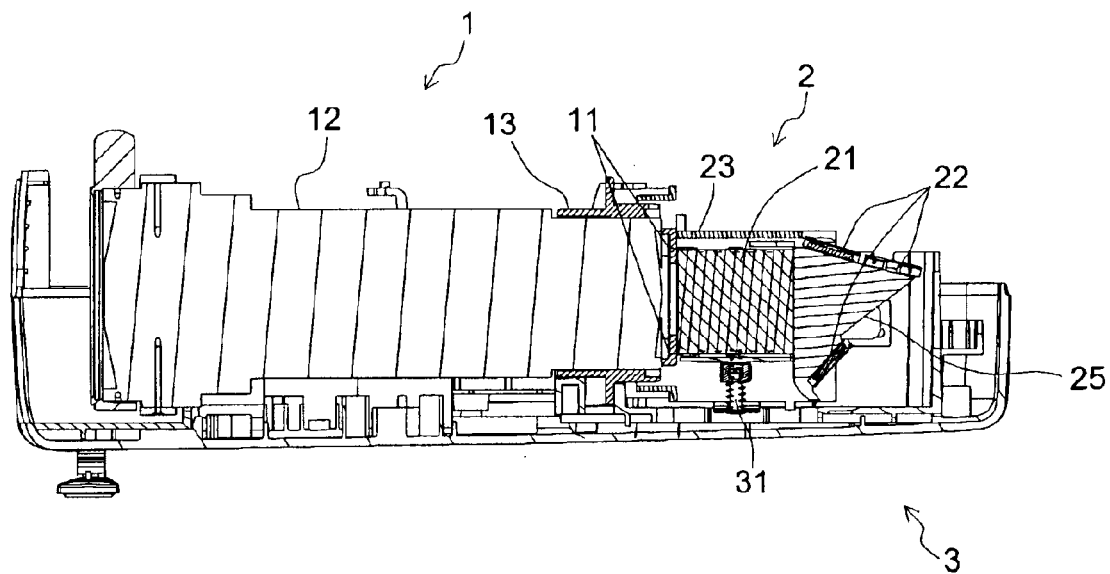
FIG. 1(b) is a cross-sectional view showing an optical system of an exemplary embodiment according to the present invention.

As shown in FIGS. 1(a) and 1(b), an optical system of the present invention includes a first optical apparatus 1, a second optical apparatus 2, a thrust member 3, and a housing 5. The first optical apparatus 1 and the thrust member 3 are disposed on the housing 5, and the second optical apparatus 2 is disposed between the first optical apparatus 1 and the thrust member 3. The first optical apparatus 1 includes a lens 12 having a lens flange 13 on a side thereof, and the lens flange 13 has a rest 11 which is a protrusion extended from the central portion of the lens 12. The second optical apparatus 2 is a polarization beam splitter, and the thrust member 3 includes a spring 32.

Figure 2A:
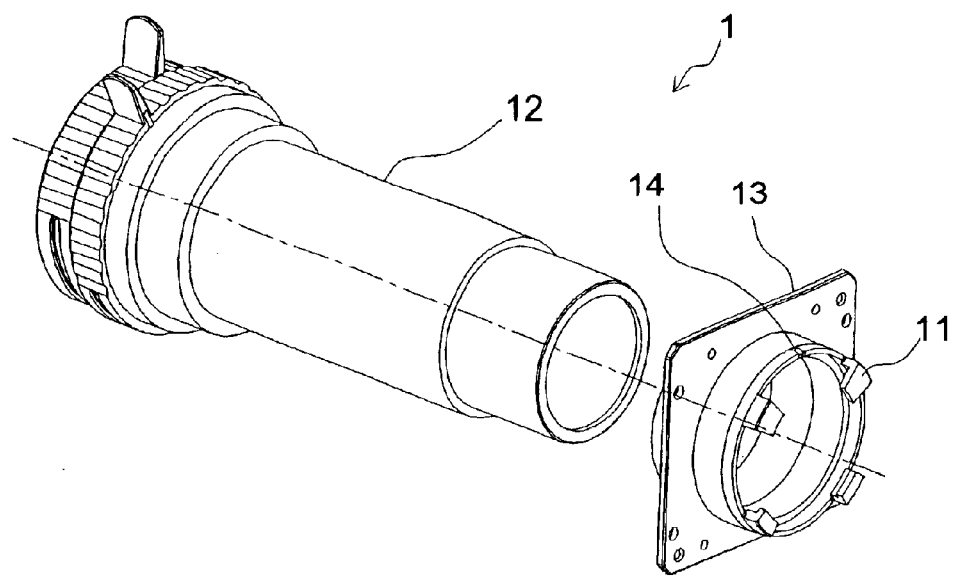
FIG. 2(a) is an exploded view showing a first optical apparatus in FIG. 1.

In FIG. 2(a), the rest 11 has four flange claws, however, other equivalent alternatives are possible.

In the optical system, the polarization beam splitter 21 is pressed against the rest 11 to maintain a desired relative relationship between the lens 12 and the polarization beam splitter 21 by means of a force applied from the thrust member 3 to a side of the polarization beam splitter 21.

The detachable polarization beam splitter 21 is pressed tightly against the rest 11 by means of a force applied from the thrust member 3. Therefore, the unprecise dimensions of the internal members less affect the optical system when the polarization beam splitter 21 needs replacement. Thus, the user doesn't need to realign the relative position of each internal members in the optical system.

Figure 2B:
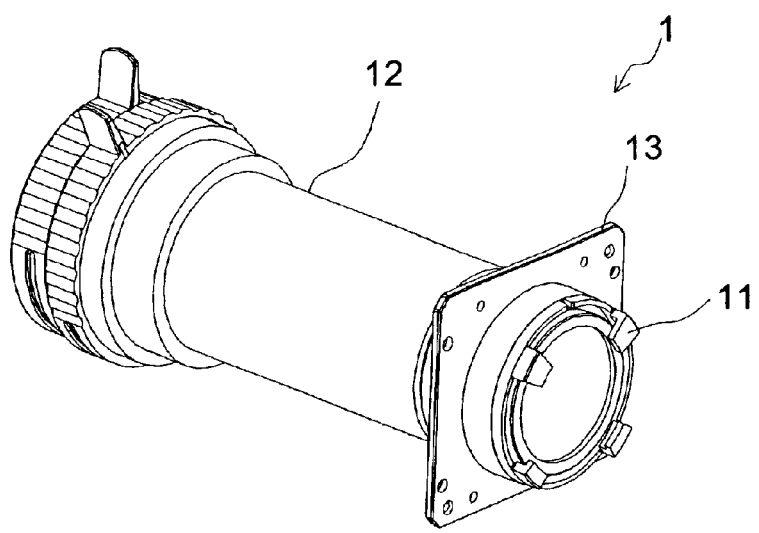
FIG. 2(b) is an assembled view showing a first optical apparatus in FIG. 1.

As shown in FIG. 2(a), the first optical apparatus 1 includes a lens 12 and a lens flange 13. The lens flange 13 has a rest 11. The central portion of the lens flange 13 is a ring, and the rest 11 is attached to the ring. Reference to FIG. 2(b), the lens 12 is inserted into the ring to touch against the rest 11 by match of the external diameter of the lens 12 and the internal diameter of the ring for positioning the lens 12.

Figure 3:
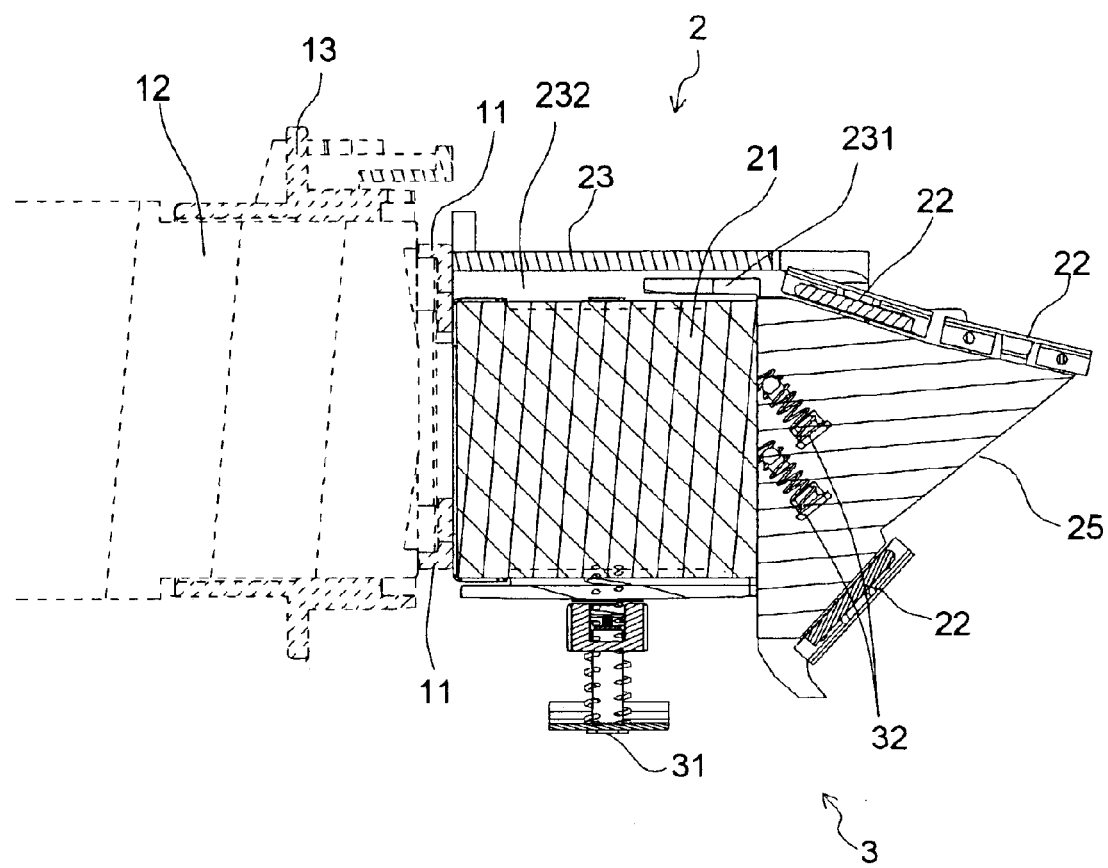
FIG. 3 is a partial enlarged view showing an optical system of an exemplary embodiment according to the present invention.

FIG. 3 illustrates the second optical apparatus 2 further including a panel 22 and a frame 23. The panel 22 is affixed onto the base 25. The polarization beam splitter 21 is slidably disposed within a space 232 that is formed in the frame 23.

The polarization beam splitter 21 receives a light signal entering vertically to the diagram plane, and transfers the light signal into a first signal parallel to the diagram plane. The panel 22 receives the first signal, and transfers the first signal into a second signal parallel to the diagram plane. Then, the second signal enters into the polarization beam splitter 21, and the polarization beam splitter 21 delivers the second signal to the lens 12 of the first optical apparatus 1. As described above, a desired relative relationship between the lens 12 and the polarization beam splitter 21 should be maintained for receiving accurately the light signal.

As shown in FIG. 3, the thrust member 3 includes two springs 32. The springs 32 are disposed on base 25 and exert forces toward the lens 12, and the other spring 31 is disposed under the frame 23. The polarization beam splitter 21 is pressed up against the rest plane 231 located above the frame 23 by means of a force applied from the spring 31. The optical system doesn't need internal members or other holders to position the polarization beam splitter 21. Accordingly, the relative position between the lens 12 and the polarization beam splitter 21 could be maintained and not affected by the unprecise dimensions of the internal members of the optical system.

Figure 4A:
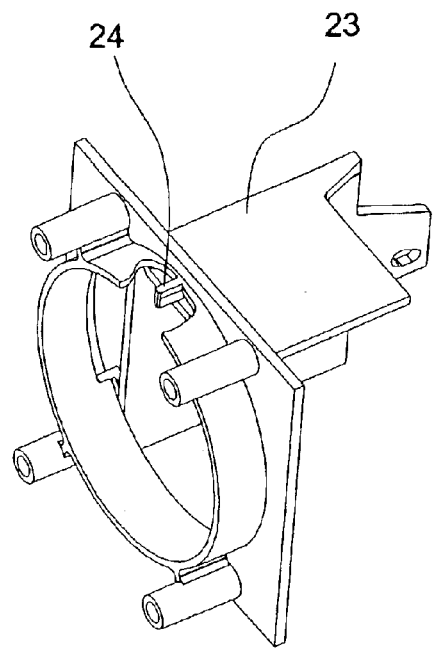
FIG. 4(a) is a diagram illustrating a frame of an exemplary embodiment according to the present invention.
Figure 4B:
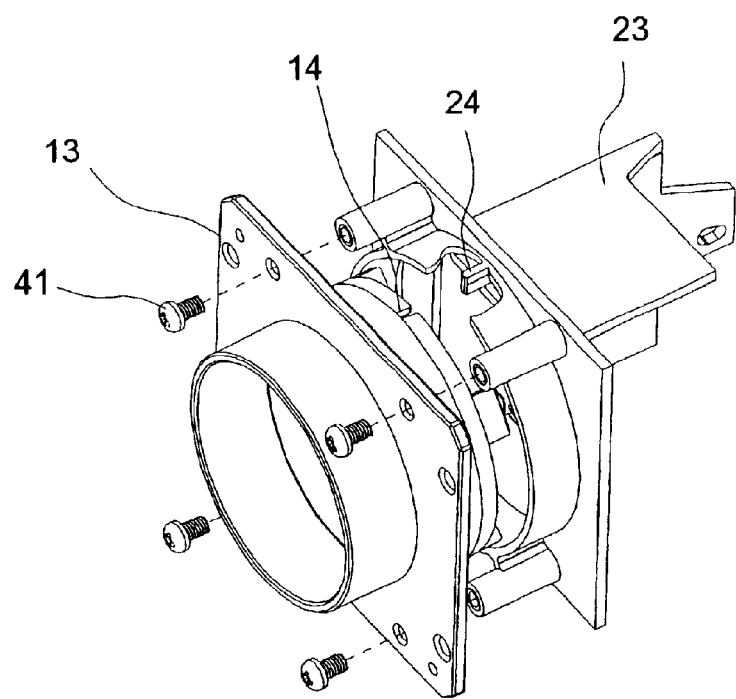
FIG. 4(b) is a diagram illustrating a lens flange connecting with the frame according to an exemplary embodiment.

Further, according to FIGS. 4(a) and 4(b), the lens flange 13 of the first optical apparatus 1 includes a positioning gap 14, and the frame 23 of the second optical apparatus 2 includes a positioning rib 24. To prevent rotation of the lens flange 13 relative to the frame 23, the positioning gap 14 locks into the positioning rib 24. In addition, the lens flange 13 connects to the frame 23 tightly by using a screw 41 for pushing the polarization beam splitter 21 against the rest 11 precisely.

The present invention also provides a method for positioning an optical system applicable in a projector or a positioning device of the optical system.

In this method of the present invention, the optical system includes a first optical apparatus having a lens and a rest on a side thereof, a thrust member, and a second optical apparatus disposed into the frame between the first optical apparatus and the thrust member. The second optical apparatus is a polarization beam splitter.

The method for positioning an optical system includes applying a force from the thrust member to press the second optical apparatus against the rest to maintain a desired relative relationship between the lens and the polarization beam splitter. The force from the thrust member automatically presses the polarization beam splitter against the rest, when the user replaces the polarization beam splitter. Accordingly, the user doesn't need to realign the position of the polarization beam splitter and the lens of the optical system. As a result, the method lowers the negative influence caused by the unprecise dimensions of internal members of the optical system.

The first optical apparatus further includes a lens flange having a positioning gap for positioning the lens. The second optical apparatus also further includes the frame having a positioning rib. To prevent rotation of the lens flange relative to the frame, the positioning gap locks into the positioning rib. In addition, the lens flange connects to the frame tightly by using a screw for pushing the polarization beam splitter against the rest precisely.

Although the invention has been shown and described with respect to the embodiments, it will be understood by those skilled in the art that various changes and modifications may be made without departing from the spirit and scope of the invention as defined in the following claims.

We claim:

1. An optical system comprising:
   a housing;
   a first optical apparatus having a rest located on a side thereof, the first optical apparatus being disposed on the housing;
   a thrust member disposed on the housing; and
   a second optical apparatus disposed between the first optical apparatus and the thrust member;
   wherein, the second optical apparatus is pressed against the rest to maintain a desired relative relationship between the first optical apparatus and the second optical apparatus by means of a force applied from the thrust member to the second optical apparatus.

2. The optical system of claim 1, wherein the second optical apparatus is detachably disposed between the first optical apparatus and the thrust member.

3. The optical system of claim 2, further comprising:
   a frame disposed between the first optical apparatus and the thrust member, the frame having a space;
   wherein the second optical apparatus is detachably disposed within the space.

4. The optical system of claim 1, wherein the first optical apparatus further comprises:
   a lens; and
   a lens flange for positioning the lens.

5. The optical system of claim 1, wherein the second optical apparatus is a polarization beam splitter.

6. The optical system of claim 3, wherein the frame further comprises a positioning rib.

7. The optical system of claim 6, wherein the first optical apparatus further comprises a positioning gap for locking with the positioning rib to prevent rotation of the first optical apparatus relative to the second optical apparatus.

8. The optical system of claim 1, wherein the thrust member comprises at least one elastic member.

9. The optical system of claim 8, wherein the elastic member is a spring.

10. The optical system of claim 1, wherein the rest comprises a flange claw.

11. A method for positioning an optical system, wherein an optical system comprises a first optical apparatus having a rest on a side thereof, a thrust member, and a second optical apparatus disposed between the first optical apparatus and the thrust member, the method comprising the steps of:
   using a force applied from the thrust member to press the second optical apparatus against the rest to maintain a desired relative relationship between the first optical apparatus and the second optical apparatus.

12. The method of claim 11, wherein the optical system further comprises a frame disposed between the first optical apparatus and the thrust members the frame includes a space for receiving the second optical apparatus.

13. The method of claim 12, wherein the first optical apparatus comprises a positioning gap and the frame comprises a positioning rib so that the positioning gap locks with the positioning rib to prevent rotation of the first optical apparatus relative to the second optical apparatus.

* * * * *